United States Patent [19]

Okino

[11] 4,395,658

[45] Jul. 26, 1983

[54] PROPER LIGHT EMISSION INDICATING DEVICE FOR COMPUTER FLASH DEVICE

[75] Inventor: Tadashi Okino, Yokohama, Japan

[73] Assignee: Canon Kabushiki Kaisha, Tokyo, Japan

[21] Appl. No.: 181,675

[22] Filed: Aug. 27, 1980

[30] Foreign Application Priority Data

Aug. 31, 1979 [JP] Japan .............................. 54-111538

[51] Int. Cl.[3] ........................ H05B 41/32; G01J 1/16

[52] U.S. Cl. .................................. 315/134; 315/136; 315/151; 315/241 P

[58] Field of Search .................................. 354/32-35, 354/60 R, 60 E, 60 L, 60 F, 53, 127, 128; 250/214 P; 340/309.1, 309.3, 377; 315/241 P, 151, 133-136

[56] References Cited

U.S. PATENT DOCUMENTS 3,979,639 9/1976 Adams, Jr. ...................... 315/241 P

*Primary Examiner*—William B. Perkey

*Attorney, Agent, or Firm*—Toren, McGeady and Stanger

[57] ABSTRACT

In the disclosed device, a sensor produces a corroborating signal when a computer flash unit emits a flash proper for an exposure. A timer energizes an indicator for a predetermined time in response to the corroborating signal. When the sensor produces a subsequent corroborating signal in response to another flash, while the indicator is energized, a reset device resets the timer. According to one embodiment of the invention, an overriding arrangement connected to the timer nullifies the operation of the timer a predetermined time after a flash emission.

2 Claims, 3 Drawing Figures

PROPER LIGHT EMISSION INDICATING DEVICE FOR COMPUTER FLASH DEVICE

BACKGROUND OF THE INVENTION

This invention relates to an indicating circuit for a computer flash device which interrupts a flash to obtain proper illumination.

One type of such computer flash unit emits light from a flash tube and senses light reflected from the object with a light sensing element so that as soon as the amount of light sensed reaches a predetermined value, the emission from the flash tube is interrupted.

In such computer flash units, the flash runs out before sufficient light has been emitted to illuminate comparatively distant objects.

Conventional computer flash units do not indicate whether a proper flash has been produced. Hence, the photographer is not informed of an under-exposure until the film has been developed.

Japanese Patent Publication No. Sho 52-8186 proposes an indicating device with an indicating lamp that lights for a predetermined time determined by a monostable multivibrator in response to a corroborating signal that occurs when the flash has stopped. This indicates proper flash emission immediately after a photograph has been taken.

While this device solves some problems, other problems remain. For example, if the next flash quickly follows the first flash, and produces its corroborating signal while the indicating lamp is lit, the corroborating signal enters the multivibrator which produces no indication in response to this confirming signal. Hence, this corroborating signal is substantially neglected and fails to indicate whether a proper flash has been emitted.

SUMMARY OF THE INVENTION

An object of the present invention is to provide an indicating device capable of indicating confirming or corroborating signals with accuracy even when a corroborating signal occurs while a previous confirming signal is being indicated.

Another object of the invention is to furnish a confirming indicating device capable of indicating with certainty whether a successive flash photograph is proper even when its flash emission is quite short.

DESCRIPTION OF PREFERRED EMBODIMENTS

Figure 1:
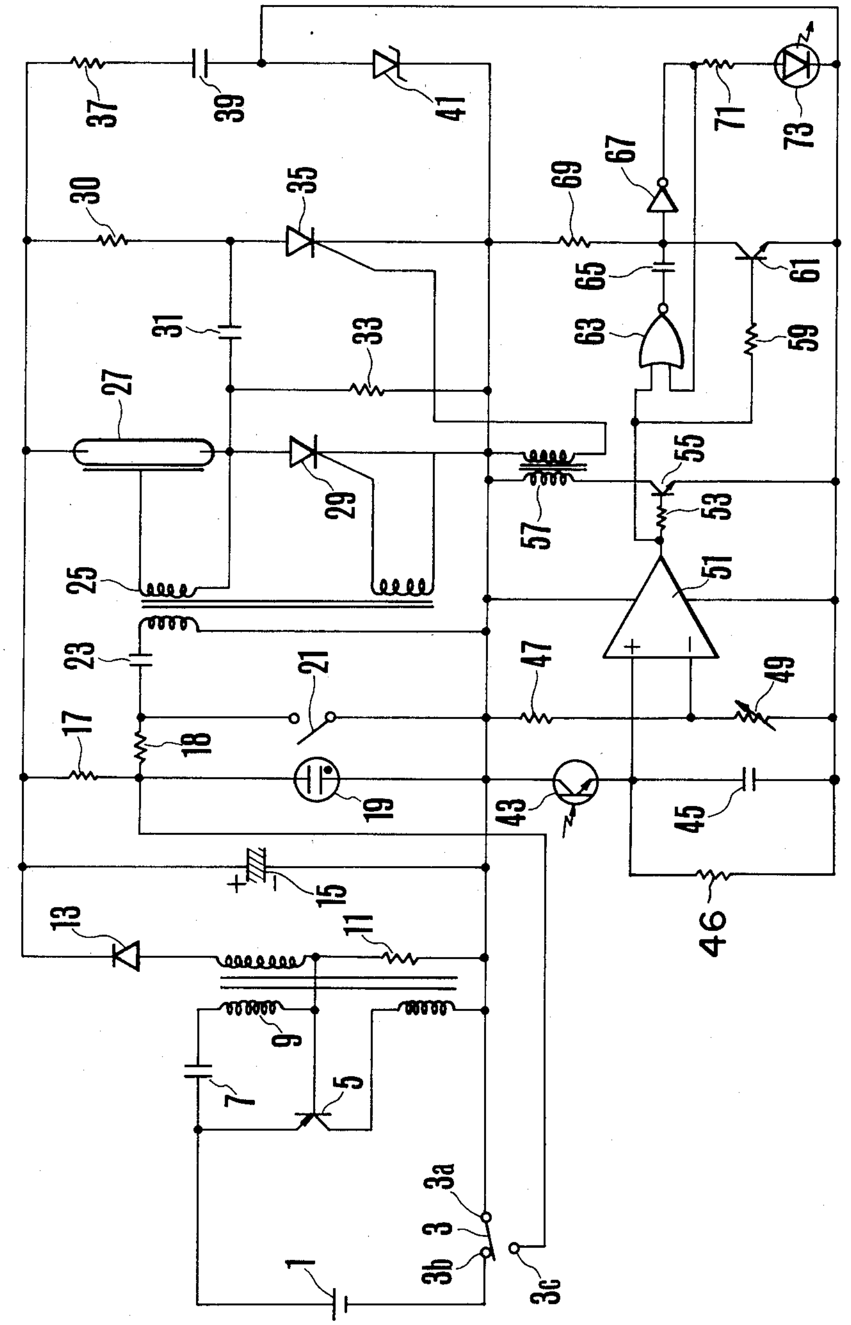
FIG. 1 shows the circuit diagram of the first embodiment of the present invention.

FIG. 1 shows the electrical circuit diagram of the computer flash device in accordance with the present invention. In the drawing, a battery 1 energizes the circuit through a switch 3. A pnp transistor 5 forms a conventional DC-DC converter with a capacitor 7, a voltage step-up transformer 9, a resistor 11, a rectifying diode 13 and a main capacitor 15 for storing the flash energy. The circuit further includes a resistor 18, a neon tube 19 connected to the DC-DC converter through a resistor 17 so as to detect the charge voltage of the main capacitor, a synchronization contact 21, a trigger capacitor 23, a trigger transformer 25 forming a trigger circuit, a flash tube 27, a thyristor 29 whose gate is connected to the secondary coil of the trigger transformer 25, capacitor 31, resistors 30 and 33 for forming a charging circuit for the capacitor 31, an auxiliary thyristor 35 and a capacitor 35 to be charged through a resistor 37 so as to form the driving power source of the light measuring circuit. A Zener diode 41 stabilizes the drive voltage of the light measuring circuit formed by the elements 43 to 57. In the light measuring circuit, a light sensing element 43 senses the light reflected from the object (not shown in the drawing). Member 45 is an integrating capacitor, 46 is a resistor connected in parallel with capacitor 45, 47 and 49 are resistors for forming the reference voltage. The resistance of the resistor 49 is adjusted by the photographic information such as the film sensitivity, the aperture value and so on. A switching npn transistor 55 is connected to the output terminal of a comparator 51 through a base resistor 53 and is connected to a pulse transformer 57. A NOR gate 63, a time constant capacitor 65, an inverter 67 and a time constant resistor 69 form a monostable multivibrator. The time interval formed by the monostable multivibrator is chosen to be sufficient for the confirming signal to be confirmed by the photographer, for example, 0.5 (sec.) or 2 (sec.). An npn transistor 61 is connected to the output terminal of the confirmation signal, namely of the comparator 51 through the base resistor 59, and the collector of the transistor 61 is connected to the connecting point of the capacitor 65 with the inverter 67 so as to discharge the charge stored in the above time constant capacitor 65. A confirming signal indicating L.E.D. 73 is connected to the output terminal of the above monostable multivibrator through the resistor 71.

Figure 2:
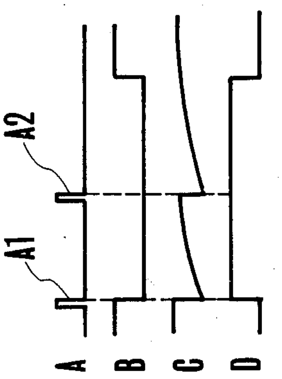
FIG. 2 shows the voltage waveform at various parts of the computer flash device shown in FIG. 1.

The computer flash device constructed as above operates in accordance with the waveforms shown in FIG. 2.

When the movable contact 3*a* of the power source switch 3 is connected to the fixed contact 3*b* so as to close the power source switch 3, the output voltage of the power source 1 is increased by means of the step up circuit, while the main capacitor 15 is charged with the stepped up voltage. As soon as the charge voltage of the main capacitor 15 reaches a predetermined value, the neon tube 19 lights up in the conventional way so as to indicate that the main capacitor 15 has been charged.

When, in synchronism with the opening of the shutter of the camera, the synchronization contact 21 is closed, the trigger circuit produces a trigger signal for triggering the flash tube 27 and the main thyristor 29. This occurs such that the charge stored in the main capacitor 15 is discharged through the flash tube 27 and the thyristor 29 so as to actuate the flash tube 27.

After actuation of the tube 27, the light reflected from the object strikes the light sensing element 43, which produces a photo-current to be integrated by means of the integrating capacitor 45. When the amount of the light incident upon the light sensing element reaches a predetermined amount, the output of the comparator 51 is inverted by means of the charge voltage of the integrating capacitor 45. The comparator 51 now produces a confirming signal. Thus, the transistor 55 is changed over so as to be conductive, while the pulse transformer 57 produces a trigger pulse so as to make the subsidiary thyristor 35 conductive. Along with the inversion of the state of the subsidiary thyristor 35, the charge stored in the capacitor 31 is discharged so that the main thyristor is switched out of the conductive state into the non-conductive state. This interrupts the discharge circuit of the main capacitor 15, so the flash tube 27 stops its light emission, after having emitted a proper amount of light.

On the other hand, when as mentioned above, the confirming signal (A1 in FIG. 2) is delivered from the output terminal of the comparator 51, the potential at the output terminal of the NOR gate 63 is lowered as shown by the waveform B in FIG. 2 in response to the signal A1. The input voltage of the inverter 67 drops and starts to increase as shown by the waveform C in FIG. 2, while the potential at the output terminal of the inverter 67 is inverted to high as shown by the waveform D in FIG. 2. The L.E.D. 73 now lights up so as to indicate that the flash tube has emitted a proper amount of light. The L.E.D. 73 is put out by inversion of the potential at the output terminal of the monostable multivibrator to a low after a lapse of time determined by the value of the resistor 69 and the capacitor 65. When the second confirming signal is produced with the comparator 51 as shown by A2 in FIG. 2, namely after lapse of the predetermined time, the transistor 61 remains conductive during the time interval corresponding to the pulse width of the second confirming signal A2 so as to discharge the charge stored in the time constant capacitor 65 of the monostable multivibrator instantly in such a manner that the terminal voltage of the capacitor 65 is reset at the initial state in response to the second confirming signal A2. The charge of the capacitor 65 starts from its initial state. When the output potential of the inverter 67 again assumes the low level as is shown by the waveform D in FIG. 2, after the lapse of time substantially determined by the resistor 69 and the capacitor 65, the L.E.D. 73 is put out so as to terminate the indication of the above second confirming signal.

Figure 3:
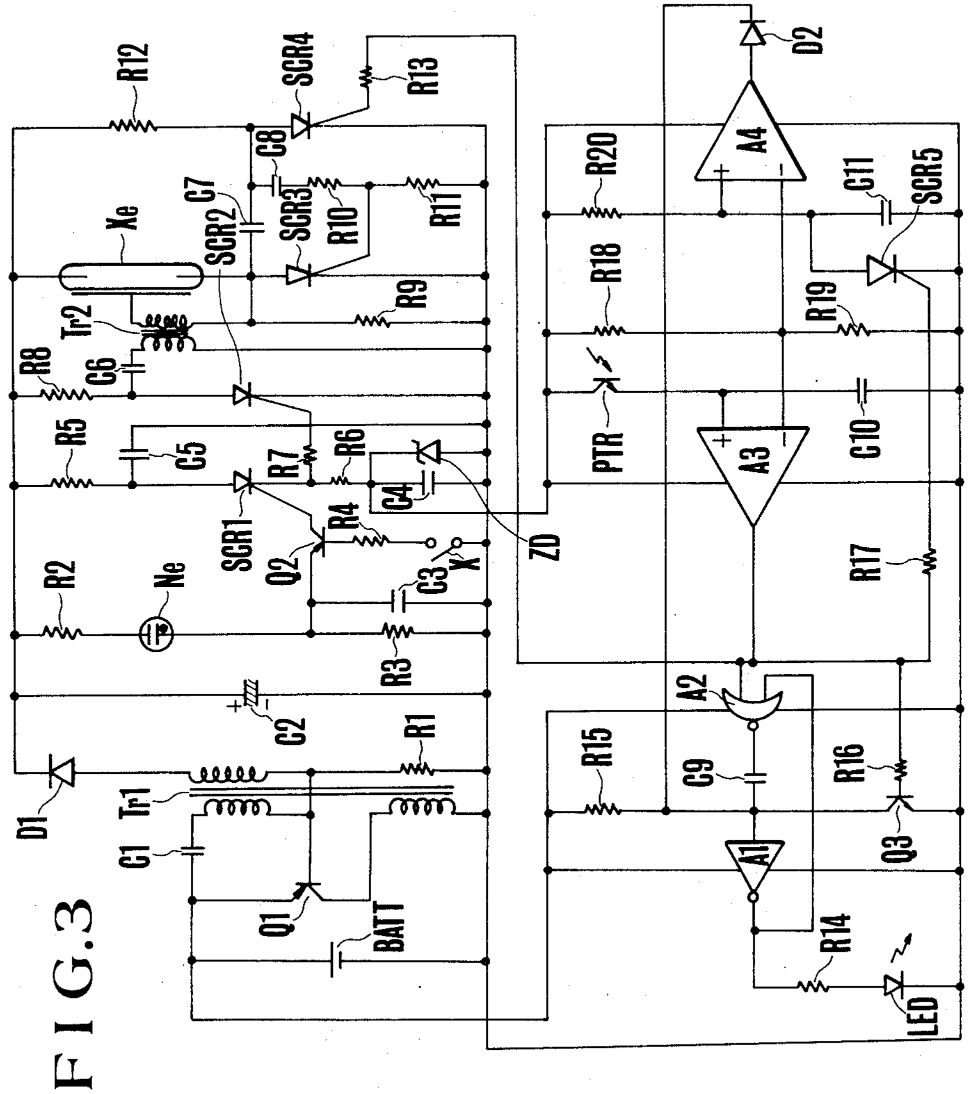
FIG. 3 shows the circuit diagram of the second embodiment of the present invention shown in FIG. 1.

The second embodiment of the present invention as shown in FIG. 3 differs from the first embodiment as follows.

In the first embodiment, the indication element 73 indicates the confirming signal for 2 (sec.) with a light emission interval of 0.2 (sec.), that at the first light emission of the flash light with a proper exposure amount is emitted, while at the next light emission, namely when the confirming signal is not generated, for example, when the whole energy stored in the main capacitor 15 is discharged, which is the so-called full light emission, the indication time of the indication element 73 is 2 (sec.). On the other hand, when the confirming signal is generated for both the first and second light emissions, the indication time of the indication element 73 is 2.2 (sec.). Consequently, in the first embodiment, it is difficult for the photographer to tell the first indication operation from the second indication operation.

The second embodiment shown in FIG. 3 furnishes not only the advantages of the first embodiment but also overcomes the above-mentioned difficulty.

In FIG. 3, Batt is the power source for the flash device. With the closing of the power source switch, not shown in the drawing, the step-up circuit consisting of the transistor Q1, the capacitor C1, the resistor R1, the oscillating transformer Tr1 starts to operate so as to produce a high voltage A.C. signal at the output. This signal is rectified by means of the diode D1 so as to charge the main capacitor C2.

When the charge voltage of capacitor C2 has reached a sufficient value for the flash emission, the voltage indication neon tube Ne lights up. Hence, the current flows through the resistors R2 and R3, while the capacitor C3 is charged. When the X contact is closed after the neon tube Ne has lit up, a base current runs through the transistor Q2 and through the resistor R4 so as to make transistor Q2 conductive. The charge voltage of C3 is now applied to the gate of the thyristor SCR1 through Q2 so as to turn on SCR1. Then the charge stored in C5 through the resistor R5 while thyristor SCR1 is non-conductive is discharged through SCR1, the resistor R6, the capacitor C4 and the Zener diode ZD. Hence, a constant voltage forms across both terminals of ZD. This voltage constitutes the power source voltage for the light measuring circuit and the computer flash confirming signal reset circuit composed of the integrated circuits A3, A4 and the elements belonging thereto. Further, the charge stored across C5 serves to apply a signal to the gate of the thyristor SCR2 through the resistor R7 so as to turn on SCR2.

At the time at which the flash starts, the power is supplied to the light measuring circuit composed of the I.C. A3, the light sensing element PTR, the integrating capacitor C10 and the resistors R18 and R19 as mentioned above. When a photo-current then runs through the light sensing element PTR in accordance with the intensity of the light reflected from the object after the flash of light starts to be emitted, the current is integrated in capacitor C10. When the voltage of capacitor C10 has reached the voltage divided by resistors R18 and R9 so as to correspond to a proper exposure, the output of A3 is altered from low to high.

When the level of the output of A3 becomes high, a signal is applied to the gate of the thyristor SCR4 through the resistor R13 so as to make SCR4 conductive. Then, the charge of the capacitor C7 charged through the resistors aR12 and R9 so that the anode of the thyristor SCR4 is positive is discharged through SCR4 so that the current which has run through the main thyristor SCR3 starts to run through C7→T SCR4. After the SCR3 is inversely biased by the capacitor C7 so as to be turned off, the emission of the flash of light is interrupted.

On the other hand, when the level of the output of circuit A3 becomes high, A3 delivers a trigger signal to the monostable multivibrator composed of the inverter A1, the NOR gate A2, the resistor R15 and the capacitor C9. Before the level of the output of A3 becomes high, the level of the two inputs to the NOR gate A2 is low so that the level of the output of A2 is high, while the level of the input to A1 is high so that the level of the output of A1 is low. This state is maintained as long as there is no external signal and therefore is called "the stable state". When the level of the output of A3 goes high as mentioned above, the level of the output of A2 goes low, while accordingly the level of the input of A1 becomes low and thus the level of the output of A1 becomes high. The output of A1 is fed back to the input of A2 so that the state once established is maintained even if the level of the output of A3 again becomes low. This state is again brought back into the stable state after the lapse of a predetermined time even if there is no external signal and therefore is called "the quasi-stable state". Immediately after the quasi-stable state has been established, C9 starts to charge through R15 until the charge voltage of C9 reaches the threshold value of the inverter A1, when the output of A1 changes out of the high level into the low level and is delivered to the input of A2 so that the level of the output of A2 becomes high, so that the stable state is again established.

The monostable multivibrator remains in the quasi-stable state only during the time interval determined with the time constant of R15 and C9, during which time interval, a current is supplied to the LED from the high level output of A1 through the resistor R14 so as to light the LED and allow the photographer to confirm that a flash of light has been emitted with a proper exposure.

If the level of the output of A3 again becomes high and A3 delivers a confirming signal while the confirming signal is being indicated, namely the capacitor C9 is being charged through the resistor R15, the signal from A3 does not influence gate A2 because the level of the one input of A2 is made high by the signal fed back from A1. Rather, a base current is delivered to the base of the transistor Q3, which operates as a first reset circuit, through the resistor R16 so as to make transistor Q3 conductive. Thus, the charge stored across capacitor C9 until then is instantly discharged through Q3. Hence, the one shot multivibrator is brought back into the condition that exists immediately after the multivibrator is changed from the stable state into the quasi-stable state in the same manner as in the above-mentioned case. Thus, the confirming signal produced with the second flash emission is indicated.

Below, let us consider the case of two flash emissions carried out in a very short time interval, and the first time the flash light is emitted with a proper exposure, while the second time, the full flash is emitted. In this case, the second reset circuit composed of the I.C. A4, the resistors R18, R19, and R20, the capacitor C11, the thyristor SCR5 and the diode D2 operate as follows. When the power source circuit is delivered to the light measuring circuit PTR, C10, R18, R19 and A3, the power source voltage is also applied to A4, and the capacitor C11 starts to charge through the resistor R20 of the time constant circuit. This charge voltage is gradually increased until it reaches the voltage formed by voltage divider resistors R18 and R19, and the output of A4 changes from low to high so that capacitor C9 is instantaneously charged up to the high voltage through the diode D2. Thus, the monostable multivibrator is immediately brought back into the stable state. Hence, the confirming indicating LED which has lit up is put out so as to indicate that the second flash emission is the full emission.

Further, when the second flash emission is also the computer flash emission, the level of the output of A4 never becomes high, namely the LED is never put out by the output of A3. This is so because at the time at which the level of the output of A3 becomes high, the gate signal is applied to the thyristor SCR5 through the resistor R17 so as to turn on SCR5. Thus, the current from R20 runs through SCR5 and not through C11 in such a manner that the voltage between the both terminals of C11 is maintained at the switched on voltage of SCR5. Further, the diode D2 serves for preventing the charge current to C9 and the charge stored in C9 from flowing into A4. The time constant of R20 and C11 should be chosen longer than the longest flash emitting time of the flash tube but shorter than the interval between the two successive flash emissions (for example, several m.sec.).

As mentioned above, in accordance with the present invention, even if the next confirming signal is produced when the confirming indicating LED still indicates the confirming information, the confirming indicating LED indicates the next confirming signal during the time interval. The photographer can then notice the signal without fail. Hence, the photographer can confirm without fail whether a proper exposure has been obtained and can recognize a photographing failure immediately after taking a picture, if any.

Even when the flash emission interval is quite short, it is possible to indicate with certainty whether the next flash photograph produces a proper exposure or not.

What is claimed is:

1. An indicating device for a computer flash unit comprising:

- sensing means for producing a confirmation signal when a flash causing a proper exposure has been emitted;
- indicating means for producing a signal;
- timing means for energizing the indicating means for a predetermined time interval in response to a confirmation signal;
- reset means for resetting the timing means when a confirmation signal occurs during energization of the indicating means by said timing means; and
- overriding means connected to said timing means to nullify the operation of the timing means when a predetermined time has elapsed after initiation of a flash.

2. An indicating device according to claim 1, wherein said overriding means includes a timer circuit which begins to start a timing operation in response to initiation of the flash.

* * * * *